Oct. 20, 1964

L. U. KIBLER 3,153,691

LIGHT MODULATOR

Filed April 12, 1962

INVENTOR
L. U. KIBLER

BY
ATTORNEY

United States Patent Office 3,153,691
Patented Oct. 20, 1964

3,153,691
LIGHT MODULATOR
Lynden U. Kibler, Middletown, N.J., assignor to Bell Telephone Laboratories, Incorporated, New York, N.Y., a corporation of New York
Filed Apr. 12, 1962, Ser. No. 187,124
11 Claims. (Cl. 88—61)

This invention relates to light modulators and more particularly to apparatus for modulating light at high frequencies.

Efficient communications use of the output of recently developed coherent light sources such as the optical maser requires that the light be modulated at frequencies in the microwave range and beyond. Semiconductive light valves are known which make use of the absorption of light by free charge carriers in semiconductive bodies. Devices of this type, which are disclosed in U.S. Patent 2,692,952 to H. B. Briggs, operate by means of variations in the charge carrier concentration in the bulk of a semiconductor positioned in the path of the light beam. As the absorption characteristics of the semiconductor are dependent on the free carrier concentration, intensity or amplitude modulation may be achieved by controlled injection across rectifying junctions or from metallic point contacts. Effective operation of these devices depends upon large scale variations in the carrier concentration throughout the bulk of a semiconductive member. The frequency response is therefore, limited by the physical extension of the property that must be varied. The modulation frequency is not only dependent upon the rate at which the carrier concentration in the semiconductive body may be increased but also upon the rate at which it may be decreased, i.e., on the recombination rate of charge carriers.

An object of this invention is to extend to higher frequencies the operating range of semiconductive light modulators.

It is also an object of this invention to improve the efficiency of light modulators utilizing electrical control of the optical properties of semiconductives.

A further object of this invention is to modulate light at frequencies in the microwave range and higher.

These and other objects of the invention are achieved in one specific illustrative embodiment comprising a semiconductive member which is transparent to light of the wavelength to be modulated. The semiconductive body has a first end surface adapted to admit a light beam to the interior thereof. A plurality of reflecting surfaces on the body are arranged to advance the light beam therethrough by multiple internal reflections to a second end surface adapted to transmit the beam to the exterior thereof. The reflecting surfaces are so arranged that the light beam to be modulated is incident thereon at an angle substantially equal to the critical angle for total internal reflection. Means are arranged along the reflecting surfaces for injecting charge carriers thereat in response to signal information.

In a second illustrative embodiment of the invention there is provided a semiconductive body having at least one extended external reflecting surface. The reflecting surface of the semiconductor is spaced from a second reflecting surface in such a way that a light beam may be caused to advance by multiple reflections therebetween. Means are arranged along the semiconductor surface for injecting charge carriers thereat in response to signal information.

It is a feature of the invention that variations in the charge carrier concentration at the reflecting surface cause local variations in the refractive index of the semiconductor thereby causing corresponding changes in the reflectivity. Thus, in the first embodiment, a change in the refractive index at the reflecting surface is accompanied by a change in the critical angle for total internal reflection. As the angle between the light beam and the surface remains constant, a portion of the beam is transmitted while the reflecting portion is diminished accordingly. In the second embodiment, according to one mode of operation, injection of charge carriers at the semiconductor surface increases the reflection losses at the surface for each reflection. Thus, the intensity of the light beam emerging after multiple reflections between the two surfaces is dependent upon the carrier concentration at various points on the surface of the semiconductor. As the recombination rates for charge carriers at a semiconductor surface are typically higher than the bulk recombination rate, higher modulation frequencies may be achieved.

It is also a feature of the invention that the carrier injection means are coupled to electrical wave propagating means so that there may be produced at selected points on the surface of the semiconductor a time dependent variation in the carrier concentration.

A further feature of the invention is that the velocity of the electrical wave is substantially equal to the net forward velocity of the multiply reflected light beam. Modulation of the light beam is achieved by modulating the electrical wave in accordance with signal information.

The above-mentioned, as well as other objects and features of the invention, will be fully understood from the following more detailed discussion taken in conjunction with the accompanying drawing in which.

Figure 1:
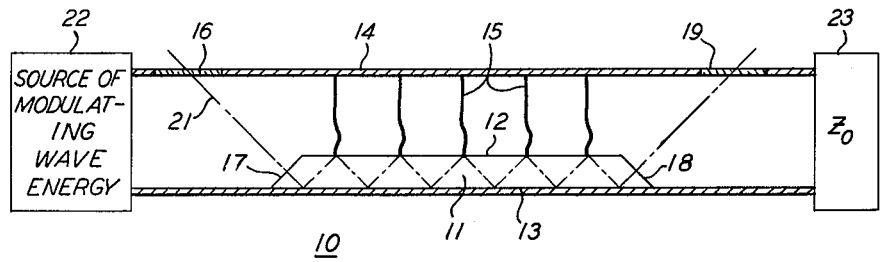
FIG. 1 is a longitudinal cross-section of a light modulator embodying the principles of the invention in which the light beam is multiply reflected within a semiconductive body.

Turning now to FIG. 1, there is shown a light modulator 10 comprising an elongated semiconductive member 11 having parallel reflecting surfaces 12 and 13. The semiconductor material comprising the member 11 is advantageously characterized by an absorption at a wavelength shorter than that of the light waves to be modulated. Operation at an optical wavelength longer than the absorption edge of the semiconductor ensures that the member 11 is substantially transparent to the light beam to be modulated. The member 11 is positioned within a hollow waveguide 14 with a surface 13, which is reflective to the light beam to be modulated, in ohmic contact with an interior surface thereof. A plurality of point contact emitters 15 are arranged along the surface 12 for injecting carriers thereat in accordance with signal information. The emitters 15 are in electrical contact with a second interior surface of the waveguide 14. Windows 16 and 19 are provided in the wall of the waveguide 14 to give access and egress to the light beam to be modulated. The light beam 21 is admitted to the interior of the body 11 through an end surface 17 and is incident on the surface 13 at substantially the critical angle for total internal reflection. Because surfaces 12 and 13 are parallel, the light reflected by surface 13 is also incident on the surface 12 at the critical angle. Light beam 21 is then multiply reflected between the surfaces 12 and 13, the incident angle at each reflection being substantially equal to the critical angle. In the illustrated embodiment, each reflection advantageously occurs at a surface region immediately adjacent a point contact emitter 15. As charge carriers are injected at selected points along the surface, the flow of currents through the bulk of the member 11 is confined to relatively small volumes. In the illustrated embodiments such currents flow from the point contacts 15 directly across the member 11 to the ohmic contact at surface 12. The carriers involved in the current flow are thus concentrated in regions through which the light beam 21 does not pass. The absorption of light energy by bulk carrier concentration is therefore substantially avoided. The light beam 21 leaves the member 11 through a second end surface 18. The point contact emitters 15 are activated by the potential difference created between opposite walls of the waveguide 14 under the influence of wave energy supplied by the source 22. In a rectangular waveguide the desired result may be achieved, for example, by excitation of the $TE_{10}$ mode. A matching impedance 23 terminates the waveguide 14 to prevent undesired reflections of the wave energy.

In the absence of wave energy from the source 22, the light beam 16 enters the semiconductive body 11 through the surface 17 and advances by internal reflections in an axial direction to the surface 18. If the light beam 16 is plane polarized, reflection losses at the end surfaces 17 and 18 may advantageously be reduced by adjusting the angle of incidence to Brewster's angle. If the light frequency is lower than the frequency which represents the absorption edge of the semiconductor and the surfaces 12 and 13 are relatively free of imperfections, the light beam 21 is normally transmitted through the member 11 with very little loss. Modulation of the beam 21 is achieved by applying potential differences across the point contacts 15, thereby injecting free charge carriers at the surface 12. As the refractive index of the semiconductor is dependent upon the density of light scattering centers, injection of charge carriers results in a change in the refractive index at the surface and, hence, in a shift of the critical angle for total reflection. However, the light beam 21 is incident on the surface 12 at a fixed angle which is no longer the critical angle. Some of the light, therefore, passes through the surface while the reflected portion is reduced accordingly. If desired, the interior surface of the waveguide 14 may be provided with a coating to scatter or absorb light escaping from the member 11. In most cases, however, light reflected back into the semiconductor 11 will be out of phase with the modulating wave and may be disregarded.

In the light modulator 10 shown in FIG. 1 a plurality of rectifying point contacts 15 are arranged along the surface 12 of the semiconductive member 11. Potential differences may be applied to the contacts 15 by causing wave energy to propagate through hte waveguide 14 in an appropriate mode. Effective modulation of the light emerging from the member 11 at the surface 18 may be achieved when the group velocity of the guided wave is equal to the net axial velocity of the multiply reflected light beam. In this way, modulation of the wave energy supplied by source 22 acts on the light beam each time it is incident on the surface 12. By iteration, a relatively small change in the refractive index results in a higher percent modulation than could be conveniently achieved by a single reflection. In addition, the invention permits the use of high frequency wave energy to vary the reflectivity of the surface 12 so that the light beam may be modulated at frequencies in the microwave range. Furthermore, the high surface recombination rate of charge carriers makes possible higher modulation frequencies than those achieved by modulating bulk charge carrier concentrations.

Figure 2:
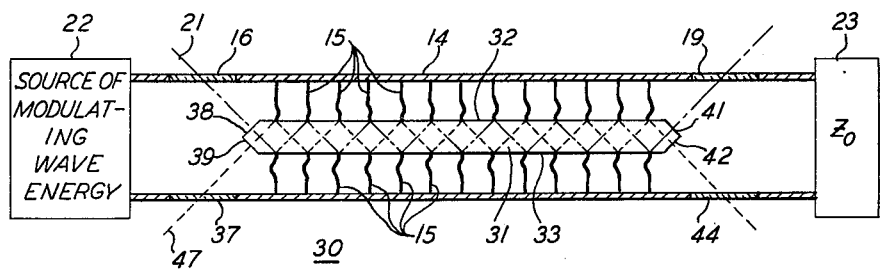
FIG. 2 is a longitudinal cross-section of a light modulator in accordance with the invention adapted to modulate simultaneously two independent light beams.

The light modulator 30 depicted in FIG. 2 is a variation of the device shown in FIG. 1, being adapted to modulate two separate light beams simultaneously. A semiconductor member 31 having reflecting surfaces 32 and 33 is positioned within the waveguide 14. The member 31 may be supported by insulator means, not shown in the drawing. Point contact emitters 15 are arranged along the surfaces 32 and 33 in the same manner as the emitters 15 are arranged along the surface 12 in FIG. 1. Light beams 21 and 47 enter the waveguide 14 through windows 16 and 37 and are transmitted to the interior of the semiconductive member 31 through end surfaces 38 and 39. The two beams advance in an axial direction by multiple internal reflections between the surfaces 32 and 33, and leave the member 31 through surfaces 41 and 42 at the opposite end. Windows 19 and 44 in the waveguide 14 are provided to pass the beams to the exterior for utilization. As in the device 10 in FIG. 1, modulaton is achieved by causing modulated wave energy from the source 22 to propagate through the waveguide 14 in an appropriate mode and with a group velocity substantially equal to the net axial velocity of the beams 21 and 47.

Figure 3:
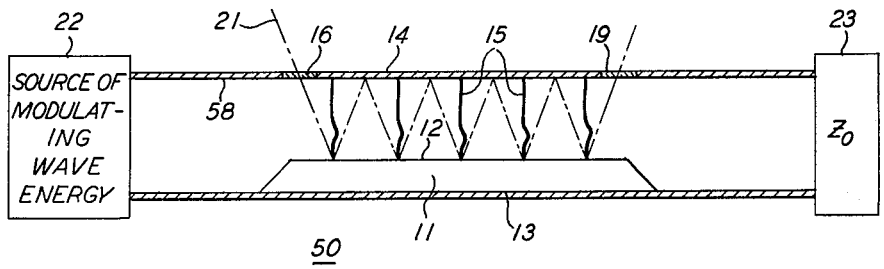
FIG. 3 is a longitudinal cross-section of a light modulator embodying the invention in which the light beam is reflected from an external surface of the semiconductor.

Another embodiment of the invention is shown in FIG. 3. The light modulator 50 is similar in all major respects to the device 10 illustrated in FIG. 1. However, instead of being internally reflected, the light beam 21 is multiply reflected between an external specular surface 12 of the semiconductive member 11 and a reflecting surface 58 spaced therefrom. In the illustrative embodiment 50 the surface 58 is an interior surface of the waveguide 14. Unless the refractive index of the semiconductor 11 is smaller than that of the medium filling the interior of the waveguide 14, the reflection coefficient of the surface 12 will be less than one and some loss will occur as the light beam bounces back and forth. On the other hand, if the waveguide 14 is filled with a transparent substance of greater refractive index, the phenomenon of total reflection may be used to advantage as in the other embodiments.

In the illustrative embodiments so far described, the charge carrier concentration at the semiconductor surface has been varied by injection from metallic point contacts. However, injection may be accomplished by a variety of other means as well. For example, the point contacts may be replaced by small area thin film p-n junctions. The area of such junctions should be small to minimize the effect of bulk carrier concentrations on the light beam. In addition, the thin film portion, which is of opposite conductivity type to the semiconductive member, should be thin enough to permit the escape of light rays incident at less than the critical angle. In another variation of the invention provision may be made for applying a bias to the injection means. Thus, the ohmic contact between the emitters and the waveguide wall may be replaced by a capacitive coupling to block the flow of direct current while permitting the flow of alternating current. The point contacts may then be biased with respect to the waveguide wall.

The choice of the semiconductor to be used in a particular embodiment depends upon the light frequency to be modulated. For example, the coherent light produced by a helium-neon optical maser has a wavelength of 1.153 microns. A light modulator in accordance with the principles of the invention and suitable for modulating light of this wavelength may employ a semiconductive member of, for example, silicon which has a refractive index of about 3.56. In air the critical angle for total internal reflection is 16.3°. The refractive index at the surface of silicon may be varied by carrier injection to produce changes of about 0.1° in the critical angle. The actual modulation frequencies which may be achieved by the invention depend upon the lifetimes for charge carriers at the semiconductor surface. These are generally between 10 percent and 50 percent of the lifetimes in the bulk of the semiconductor, the recombination rates being determined by the surface properties of a particular sample as influenced by various known surface treatments.

Although the invention has been described with particular reference to a number of specific embodiments, many modifications and variations are possible and may be made by those skilled in the art without departing from its scope and spirit.

What is claimed is:

1. A light modulator comprising
a semiconductive body having a longitudinally extended reflective surface portion,
means for directing a light beam at said surface portion for reflection therefrom,
means for redirecting the reflected light beam at said surface portion for iterative reflections therefrom,
said beam being advanced by said iterative reflections in a longitudinal direction with a predetermined velocity,
free charge carrier injection means arranged along said reflective surface on the longitudinal path of said beam for varying the reflectivity of said surface in response to applied signals,
and means for applying traveling wave energy to said injection means,
said traveling wave energy being propagated with a group velocity substantially equal to the longitudinal velocity of said light beam.

2. A light modulator comprising
an elongated semiconductive body which is transparent to light of the wavelength to be modulated, said body being characterized by a longitudinal axis,
means for admitting a light beam to the interior of said body,
a plurality of reflecting surfaces on said body arranged to advance said light beam therethrough by multiple internal reflections with a predetermined longitudinal velocity,
means for transmitting said multiply reflected light beam to the exterior of said body,
free charge carrier injection means arranged along said body for varying the reflectivity of said surfaces in response to applied signals,
and waveguide means for applying modulated traveling wave energy to said injection means,
said wave energy being propagated with a group velocity substantially equal to the longitudinal velocity of said light beam.

3. A light modulator as claimed in claim 2 wherein said light beam is incident on said reflecting surfaces at substantially the critical angle for total internal reflection.

4. A light modulator as claimed in claim 2 wherein said light beam admitting means comprises a Brewster angle surface on said body.

5. A light modulator comprising
an elongated semiconductive body which is substantially transparent to light of the wavelength to be modulated, said body being characterized by a longitudinal axis,
said body having a surface for admitting a light beam to the interior thereof,
and a plurality of surfaces arranged to advance said beam by multiple internal reflections along a light path through said body with a predetermined axial velocity, said beam being incident on said reflective surfaces at substantially the critical angle,
said body also having a surface for transmitting said multiply reflected light beam to the exterior thereof,
free charge carrier injection means arranged along at least one of said reflecting surfaces for varying the reflectivity thereof,
said semiconductive body being positioned within an elongated waveguide for propagating electromagnetic wave energy with a group velocity substantially equal to the axial velocity of said multiple reflected light beam,
said waveguide coupling said wave energy to said carrier injection means for producing at selected points on the surface of said body a time varying concentration of free charge carriers,
and transparent windows in said waveguide for giving access and egress to the light beam to be modulated.

6. A light modulator comprising
an elongated semiconductive body which is transparent to light of the wavelength to be modulated, said body being characterized by a longitudinal axis,
said body having a pair of longitudinally extended parallel surfaces,
a first end surface of said body arranged to admit a light beam to the interior thereof for multiple reflection between said parallel surfaces,
said light beam being incident on said surfaces at substantially the critical angle for internal reflection and advancing with a predetermined axial velocity through said body,
a second end surface of said body arranged to transmit the multiply reflected light beam to the exterior thereof,
rectifying barriers arranged along an extended surface of said body for electrically injecting free charge carriers therein,
said body being positioned within an elongated hollow waveguide for propagating electromagnetic wave energy with a group velocity substantially equal to the axial velocity of said light beam,
the energy propagated in said waveguide being coupled to said rectifying barriers to produce a time varying surface concentration of free charge carriers along said body,
and transparent windows in said waveguide for giving access and egress to the light beam to be modulated.

7. A light modulator comprising
an elongated semiconductive body which is transparent to light of the wavelength to be modulated, said body being characterized by a longitudinal axis,
said body having first and second longitudinally extended parallel surfaces,
and inclined end surfaces having normals which lie in a plane containing the axis of said body,
the inclination of said end surfaces to said parallel surfaces being substantially equal to the critical angle for internal reflection of light rays within said body,
whereby a light beam normally incident on one of said end surfaces is transmitted to the interior of said body and advances in an axial direction by multiple internal reflections to exit through the other end surface,
an elongated hollow waveguide for propagating electromagnetic wave energy with a group velocity substantially equal to the axial velocity of said multiple reflected light beam,
said semiconductive body being positioned within said waveguide with the first of said parallel surfaces in ohmic contact with a first interior surface thereof,
an array of point contact emitters axially spaced along the second of said parallel surfaces,
said emitters being in ohmic contact with a second interior surface of said waveguide,
whereby the injection of free charge carriers into said body by said emitters varies with the instantaneous potential between said first and second interior surfaces of said waveguide,
and transparent windows in said waveguide for giving access and egress to the light beam to be modulated.

8. A light modulator comprising
an elongated semiconductive body which is normally transparent to light of greater than a threshold wavelength, said body being characterized by a longitudinal axis,
said body having first and second longitudinally extended parallel surfaces,
and end surfaces for giving access and egress to first and second light beams to and from the interior of said body,
said first and second light beams being interiorly incident on said first and second parallel surfaces, respectively, the planes of incidence being parallel to the axis of said body and the angles of incidence being substantially equal to the critical angle for internal reflection of light rays within said body, whereby light beams entering at one end of said body advance in an axial direction by multiple internal reflections to exit at the other end thereof, an elongated hollow waveguide for propagating electromagnetic wave energy with a group velocity substantially equal to the axial velocity of said multiple reflected light beams, said semiconductive body being positioned within said waveguide, an array of point contact emitters axially spaced along said first and second parallel surfaces, the emitters on said surfaces being in ohmic contact with first and second interior surfaces of said waveguide, respectively, whereby the injection of free charge carriers into said body by said emitters varies with the instantaneous potential difference between said first and second waveguide surfaces, and transparent windows in said waveguide for giving access and egress to the light beams to be modulated.

9. A light modulator comprising an elongated semiconductive member which is reflective to light of the wavelength to be modulated, said member having a longitudinally extended reflective surface, an elongated hollow waveguide for propagating electromagnetic wave energy longitudinally with a specified group velocity, said waveguide having a flat longitudinally extended reflective interior surface, said semiconductive member being positioned within said waveguide in ohmic contact with a first interior surface thereof, the reflective surface of said member being spaced from the reflective interior surface of said waveguide, whereby said reflective surfaces in combination advance the light beam to be modulated in the longitudinal direction by iterative reflections therebetween, the longitudinal velocity of said light beam being substantially equal to the group velocity of the wave energy propagated in said waveguide, an array of point contact emitters longitudinally spaced along the reflective surface of said semiconductive member, said emitters being in electrical contact with a second interior surface of said waveguide, whereby the injection of free charge carriers into said member by said emitters varies with the instantaneous potential difference between said first and second interior surfaces of said waveguide, and transparent windows in said waveguide for giving access and egress to the light beam.

10. A light modulator comprising an elongated semiconductive member having a longitudinally extended specular surface, a reflective surface spaced from said specular surface, free charge carrier injection means arranged along said specular surface, means for directing a light beam to be modulated onto said surfaces for multiple reflection therebetween, said light beam advancing in the longitudinal direction with a predetermined velocity, waveguide means for propagating electromagnetic wave energy with a group velocity substantially equal to the longitudinal velocity of said light beam, and means for coupling said wave energy to said carrier injection means to produce a traveling wave of free carriers on said specular surface.

11. A light modulator as claimed in claim 9 in which said semiconductive member is immersed in a transparent medium having a higher refractive index than said member, and said light beam is incident on said specular surface of said member at substantially the critical angle for total reflection.

References Cited in the file of this patent

UNITED STATES PATENTS

| 2,692,952 | Briggs | Oct. 26, 1954 |
| 3,021,754 | Ross | Feb. 20, 1962 |

FOREIGN PATENTS

| 733,566 | Great Britain | July 13, 1955 |